US011359512B1

(12) United States Patent
Turcotte et al.

(10) Patent No.: US 11,359,512 B1
(45) Date of Patent: Jun. 14, 2022

(54) TORQUE PROBE COOLING FOR GAS TURBINE ENGINE USING INTERNAL FLUID FLOW

(71) Applicant: PRATT & WHITNEY CANADA CORP., Longueuil (CA)

(72) Inventors: Hervé Turcotte, Sainte-Julie (CA); Gabriel Naccache, Longueuil (CA); Adam Logan, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/165,033

(22) Filed: Feb. 2, 2021

(51) Int. Cl.
| *F01D 25/12* | (2006.01) |
| *F02C 7/06* | (2006.01) |
| *F02C 7/32* | (2006.01) |
| *F02C 7/24* | (2006.01) |
| *F01D 21/00* | (2006.01) |

(52) U.S. Cl.
CPC ........... *F01D 25/12* (2013.01); *F01D 21/003* (2013.01); *F02C 7/06* (2013.01); *F02C 7/24* (2013.01); *F02C 7/32* (2013.01); *F05D 2240/50* (2013.01); *F05D 2260/231* (2013.01); *F05D 2260/4031* (2013.01); *F05D 2260/608* (2013.01); *F05D 2270/80* (2013.01)

(58) Field of Classification Search
CPC .......... F01D 25/12; F04D 21/003; F02C 7/06; F02C 7/24; F02C 7/32; F05D 2240/50; F05D 2260/231; F05D 2260/4031; F05D 2260/608; F05D 2270/80
See application file for complete search history.

(56) References Cited

U.S. PATENT DOCUMENTS

| 5,373,234 A * | 12/1994 | Kulczyk | G01P 3/488 73/514.39 |
| 6,445,177 B1 * | 9/2002 | Higgins | F16N 29/00 411/7 |
| 8,047,769 B2 * | 11/2011 | Ballard, Jr. | F01D 25/00 415/138 |
| 9,863,261 B2 * | 1/2018 | Chuong | F01D 9/065 |
| 9,951,647 B2 * | 4/2018 | Rawson | F01D 25/002 |

* cited by examiner

*Primary Examiner* — Igor Kershteyn
(74) *Attorney, Agent, or Firm* — Norton Rose Fulbright Canada LLP (57) ABSTRACT

Cooling a torque probe involves an elongated sleeve extending along a sleeve axis between a first sleeve end and a second sleeve end. The sleeve is mountable about the torque probe to define a flow passage between an inner surface of the sleeve and an outer surface of the torque probe. The flow passage is in fluid communication with a flow passage inlet of the sleeve and with a flow passage outlet of the sleeve spaced apart along the sleeve axis from the flow passage inlet. A cooling fluid is configured to flow into the flow passage via the flow passage inlet, through the flow passage along the outer surface of the torque probe to cool the torque probe, and out of the flow passage via the flow passage outlet.

20 Claims, 5 Drawing Sheets

TORQUE PROBE COOLING FOR GAS TURBINE ENGINE USING INTERNAL FLUID FLOW

CROSS-REFERENCE TO RELATED APPLICATIONS

Reference is made to US patent application entitled "TORQUE PROBE COOLING FOR GAS TURBINE ENGINE USING EXTERNAL AIR" and filed on Feb. 2, 2021, the entirety of which is incorporated by reference herein, and whose application number will be indicated here when known.

TECHNICAL FIELD

The application relates generally to gas turbine engines and, more particularly, to gas turbine engines with torque measuring probes.

BACKGROUND

On some gas turbine engines, such as turboprop or turboshaft engines, the output torque of the engine is measured with a torque probe which uses a torque meter. In some engine architectures, it may be necessary to install the torque probe in a hot section of the engine. The elevated temperature in the hot section caused by the hardware surrounding the torque probe may have an impact on the electronic components of the torque probe.

SUMMARY

There is disclosed a gas turbine engine, comprising: an exhaust case enclosing an exhaust duct and a bearing housing, the bearing housing defining a bearing cavity and enclosing bearings mounted to a shaft; a torque probe extending inwardly into the exhaust case along a torque probe axis and positioned adjacent to the exhaust duct, the torque probe configured to determine a torque on the shaft; a sleeve enclosing at least part of the torque probe, the sleeve defining a flow passage between an inner surface of the sleeve and an outer surface of the torque probe, the flow passage being in fluid communication with a flow passage inlet of the sleeve and with a flow passage outlet of the sleeve, the flow passage inlet in fluid communication with the bearing cavity to receive a cooling fluid therefrom; and a vent extending between a vent inlet in fluid communication with the flow passage outlet and a vent outlet positioned outside the exhaust case; wherein during operation of the gas turbine engine, the cooling fluid flows from the bearing cavity, into the flow passage along the outer surface of the torque probe to cool the torque probe, and into the vent to be discharged via the vent outlet.

There is disclosed a method for cooling a torque probe disposed adjacent to an exhaust duct within an exhaust case of a gas turbine engine, the method comprising: forming a fluid flow path from a bearing cavity of the gas turbine engine to an outlet positioned outside of the exhaust case; and positioning the torque probe within the fluid flow path downstream of the bearing cavity and upstream of the outlet, a cooling fluid flowing from the bearing cavity, along the torque probe to cool the torque probe, and to the outlet when the gas turbine engine is operating.

There is disclosed a torque probe heat shield mountable about an outer surface of a torque probe, the torque probe heat shield comprising: an elongated sleeve extending along a sleeve axis between a first sleeve end and a second sleeve end, the sleeve mountable about the torque probe to define a flow passage between an inner surface of the sleeve and an outer surface of the torque probe, the flow passage being in fluid communication with a flow passage inlet of the sleeve and with a flow passage outlet of the sleeve spaced apart along the sleeve axis from the flow passage inlet, a cooling fluid configured to flow into the flow passage via the flow passage inlet, through the flow passage along the outer surface of the torque probe to cool the torque probe, and out of the flow passage via the flow passage outlet.

DESCRIPTION OF THE DRAWINGS

Reference is now made to the accompanying figures in which.

DETAILED DESCRIPTION

Figure 1:
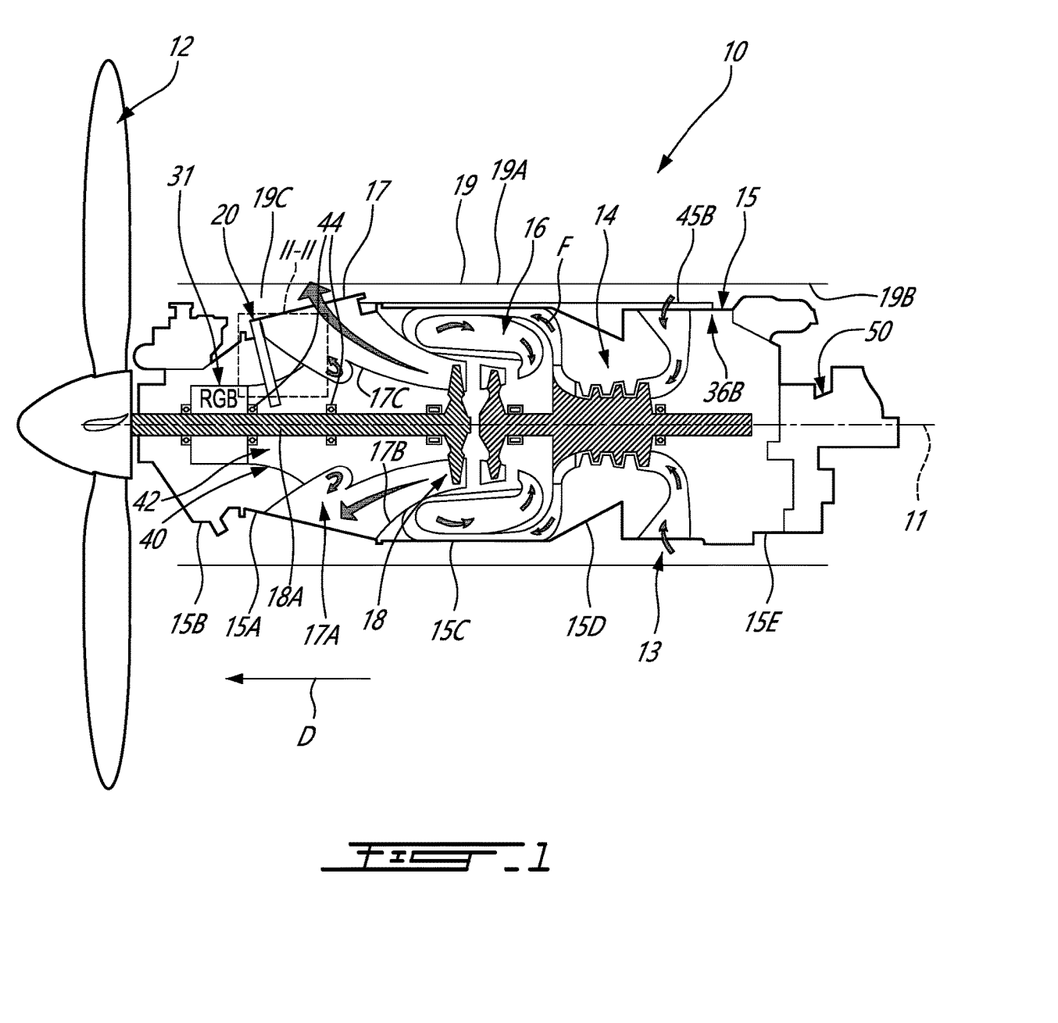
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 extends along a longitudinal center axis 11 about which many of its components rotate. In FIG. 1, the turbine section 18 drives a propeller 12 mounted at an end of the gas turbine engine 10 opposite to an air inlet 13.

The internal components of the gas turbine engine 10 (sometimes referred to herein simply as the "engine 10") are housed in a casing 15. The casing 15 is an annular body defining an interior of the engine 10 which houses the turbomachinery and other components of the engine 10. Referring to FIG. 1, the casing 15 is made up of multiple casing segments, or cases, which are axially adjacent each other and connected to one another. In the configuration of the engine 10 shown in FIG. 1, one the casing segments is an exhaust case 15A. The exhaust case 15A is an annular body that defines an interior volume in which one or more exhaust ducts 17 and other components are housed. Each exhaust duct 17 defines a flow path from the exit of the turbine section 18 to convey the combustion gases out of the casing 15 and away from the engine 10 via an exhaust outlet 17A. The exhaust duct 17 has an interior surface 17B which faces the hot combustion gases, and an exterior surface 17C which faces inwardly toward the volume defined by the exhaust case 15A. During operation of the engine 10, when hot combustion gases are flowing through the exhaust duct 17, the interior and exterior surfaces 17B,17C heat up such that they radiate heat into the exhaust case 15A, and also provide convection heat transfer to the exhaust case 15A by heating the air therein with the exhaust duct 17. The casing 15 also includes the following cases: a reduction gearbox case 15B which houses a reduction gearbox 31, a hot section case 15C which houses the turbine section 18, a cold section case 15D which houses the compressor section 14, and an accessory gearbox case 15E which houses the accessory gearbox 50. Referring to FIG. 1, the exhaust case 15A is mounted to the reduction gearbox case 15B at one axial end of the exhaust case 15A, and is mounted to the hot section case 15C at the other axial end of the exhaust case 15A. The cases may be mounted to each other with mating radially-outer flanges that are bolted together. The cases may be made of metal of any suitable alloy. The casing 15 may have more or fewer cases than the ones shown in FIG. 1, and the cases may be arranged differently than as shown.

Referring to FIG. 1, the engine 10 has a nacelle 19. The nacelle 19 is an annular body, made up of one or more segments, which surrounds the casing 15 and one or more of its cases. The nacelle 19 has an outer surface 19A which forms part of the visible exterior of the engine, and an inner surface 19B which faces toward the casing 15. Referring to FIG. 1, the nacelle 19 surrounds and encloses at least the exhaust case 15A and the reduction gearbox case 15B. The inner surface 19B of the nacelle 19A is spaced apart from surfaces of parts of casing 15, such as from the surfaces of the exhaust case 15A and the reduction gearbox case 15B as shown in FIG. 1, in a direction parallel to a radial line from the center axis 11 of the engine 10. A nacelle flow passage 19C is thus defined in this radial or annular space between the inner surface 19B of the nacelle 19A and these surfaces of the cases 15A,15B. Ambient air from outside the engine circulates through, or is present within, the nacelle flow passage 19C.

Referring to FIG. 1, the reduction gearbox 31 (sometimes referred to herein simply as the "RGB 31") of engine 10 is drivingly engaged to an output shaft 18A driven by the turbine section 18. In FIG. 1, the RGB 31 is disposed axially between the turbine section 18 and the propeller 12. The output shaft 18A of the engine 10 is thus drivingly connected to the propeller 12 via the RGB 31. The RGB 31 processes and outputs the rotational drive transferred thereto from the turbine section 18 via the output shaft 18A through known gear reduction techniques. The RGB 31 allows for the propeller 12 to be driven at its optimal rotational speed, which may be different from the rotational speed of the turbine section 18.

Referring to FIG. 1, the accessory gearbox 50 (sometimes referred to herein simply as the "AGB 50") the engine 10 receives a rotational output and in turn drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs. The AGB 50 is positioned at an end of the engine 10 that is axially opposite to the end of the engine 10 at which the RGB 31 is located. The AGB 50 is aft of the air inlet 13. The AGB 50 is housed within the accessory gearbox case 15E, but it may also be free of a case. The AGB 50 is outside of the exhaust case 15A. In an alternate possible embodiment the engine 10, the engine 10 is free of an AGB 50. The AGB 50 can be arranged relative to the casing 15 of the engine 10 differently than as shown in FIG. 1. For example, the AGB 50 may be mounted on the side of the engine 10, and forward of the air inlet 13. The circumferential angular position of the AGB 50 may be selected to suit specific installation needs. Other positions and arrangements for the AGB 50 are thus possible.

Referring to FIG. 1, the engine 10 is a "reverse-flow" engine 10 because gases flow through its components from the air inlet 13 at a rear or aft portion of the engine 10, to the exhaust outlet 17A at a front portion of the engine 10. This is in contrast to "through-flow" gas turbine engines in which gases flow through the core of the engine from a front portion to a rear portion. The direction of the flow of gases through the engine 10 is shown in FIG. 1 with arrows F. The direction of the flow of gases F through the engine 10 can be better appreciated by considering that the gases flow through the engine 10 in the same direction D as the one along which the engine 10 travels during forward flight. Stated differently, gases flow through the engine 10 from a rear end adjacent the AGB 50 towards a front end adjacent the propeller 12. In an alternate embodiment, the engine 10 is a through-flow engine 10. Referring to FIG. 1, the engine 10 is a reverse-flow turboprop engine 10. The engine 10 may be another type of gas turbine engine, for example, a turbofan and a turbojet.

It will thus be appreciated that the expressions "forward" and "aft" used herein may refer to the relative disposition of components of the engine 10, in correspondence to the "forward" and "aft" directions of the engine 10 and aircraft including the engine 10 as defined with respect to the direction of travel D. In the embodiment shown, a component of the engine 10 that is "forward" of another component is arranged within the engine 10 such that it is located closer to the propeller 12. Similarly, a component of the engine 10 that is "aft" of another component is arranged within the engine 10 such that it is further away from the propeller 12.

Referring to FIG. 1, the engine 10 includes a bearing housing 40 disposed within, and housed by, the exhaust case 15A. The bearing housing 40 is an annular body defining an internal bearing cavity 42 in which one or bearings 44 are located. The bearings 44 engage and support the output shaft 18A and its rotation about the center axis 11 of the engine 10. The bearing housing 40 and the bearing cavity 42 are sealed off from a remainder of the internal volume of the exhaust case 15A to prevent oil or an oil mist from escaping the bearing cavity 42 and entering the hot zone within the exhaust case 15A adjacent to the exhaust duct 17. The pressure within the bearing housing 40, or the pressure of the bearing cavity 42, may thus be different than a pressure within the remainder of the exhaust case 15A. The engine 10 may also have other bearing housings 40 to enclose other bearings 44 of the engine 10 which support other shafts or different portions of the output shaft 18A. These additional bearing housings 40 may be enclosed by other cases of the casing 15.

Figure 2:
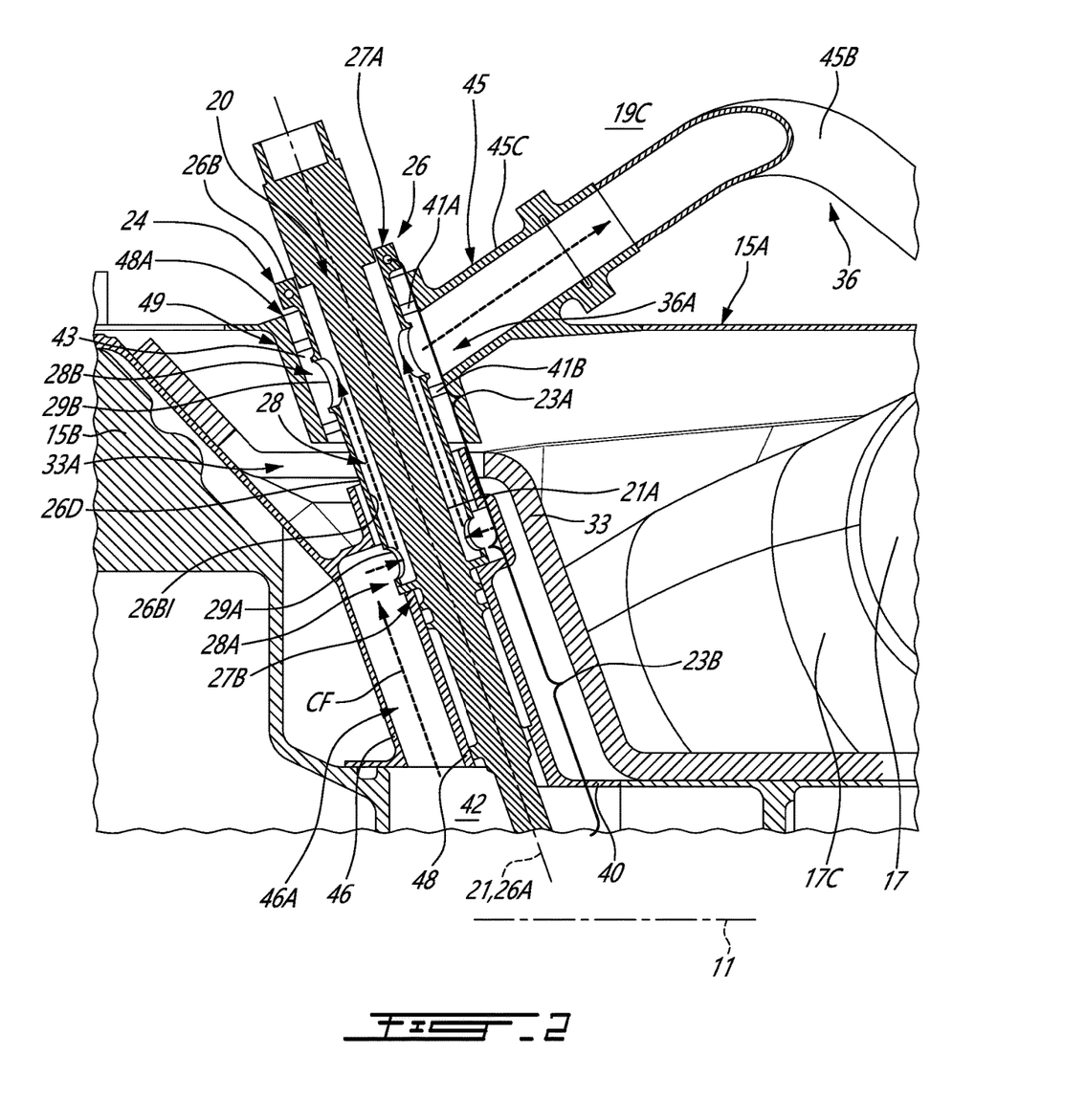
FIG. 2 is an enlarged cross-sectional view of the region II-II in FIG. 1 showing a torque probe.

Referring to FIG. 1, the engine 10 has a torque probe 20 configured to measure a torque of a shaft of the engine 10. The torque probe 20 may house or include electronic components, such as a torque meter or a phase shift torque meter, to measure the torque on, or generated by, the output shaft 18A. The torque probe 20 is an elongated body extending along a torque probe axis 21 (see FIG. 2) from a first end inwardly into the exhaust case 15A to a second end that measures the torque of the output shaft 18A. Most of the torque probe 20, including the second end, is disposed within the exhaust case 15A. More particularly, the second end and some of the length of the torque probe 20 defined along the torque probe axis 21 is positioned within the bearing cavity 42. A portion of the torque probe 20, such as the first end, is located outside of the exhaust case 15A within the nacelle flow passage 19C. The torque probe 20 extends inwardly into the exhaust case 15A through an opening in the exhaust case 15A, which is described in greater detail below. The torque probe 20 may not be mounted directly to the exhaust case 15A, and may instead be positioned relative to the exhaust case 15A to displace with respect to the exhaust case 15A, as described in greater detail below. The torque probe axis 21 is straight. Referring to FIG. 2, the orientation vector of the torque probe axis 21 in the plane of the page showing FIG. 2 has a radial component (parallel to a line extending radially from the center axis 11 of the engine 10) and an axial component (parallel to the center axis 11). The magnitude of the radial component of the orientation vector of the torque probe axis 21 is much greater than the magnitude of the axial component of the orientation vector, such that the torque probe axis 21 has a substantially radial orientation.

Referring to FIG. 1, some or all of the torque probe 20 is positioned adjacent to the exhaust duct 17 within the exhaust case 15A. By "adjacent", it is understood that the torque probe 20 is positioned in proximity to the exhaust duct 17 such that it is exposed to heat radiating from the hot exterior surface 17C of the exhaust duct 17 during operation of the engine 10. In embodiments, only some of the torque probe 20 may be positioned adjacent to the exhaust duct 17 and exposed to its radiative heat. For example, in an embodiment, only the length of the torque probe 20 extending radially relative to the center axis 11 between the exhaust case 15A and the bearing housing 40 is positioned adjacent to the exhaust duct 17 and exposed to its radiative heat. The torque probe 20 may also be exposed to convection heat transfer from the air heated by the surfaces of the exhaust duct 17.

The proximity of the torque probe 20 and its electronic equipment to the exhaust duct 17 and the heat radiated by the exhaust duct 17 requires that thermal protection be provided to the torque probe 20. Referring to FIG. 2, some or all of the length of the torque probe 20 may be shielded from the hot exterior surface 17C of the exhaust duct 17 by a thermal blanket 33. The thermal blanket 33 is a covering which may be wrapped or draped around components to thermally insulate them. Referring to FIG. 2, the thermal blanket 33 is disposed within the exhaust case 15A. It is positioned axially, relative to the center axis 11, between the torque probe 20 and the exhaust duct 17, so as to cover the torque probe 20 and protect it from some of the radiative heat emanating from the exhaust duct 17. The thermal blanket 33 has one or more openings 33A through which the torque probe 20 is inserted and extends through. The thermal blanket 33 may be mounted to any suitable structure within the exhaust case 15A. For example, and referring to FIG. 2, part of the thermal blanket 33 extends along the bearing housing 40 and may be attached thereto.

The thermal blanket 33 provides temperature protection to the torque probe 20 by blocking at least some of the radiative heat from the exhaust duct 17 before it is experienced by the torque probe 20. The thermal blanket 33 thus provides "passive" thermal protection because is protects the torque probe 20 solely because of its presence between the torque probe 20 and the exhaust duct 17. Additional passive thermal protection may be provided by a torque probe heat shield 24. Referring to FIG. 2, the torque probe heat shield 24 encloses part of the annular body of the torque probe 20 to further thermally insulate the torque probe 20 by blocking at least some of the radiative heat from the exhaust duct 17 before it is experienced by the torque probe 20. The torque probe heat shield 24 may have any suitable shape or arrangement to achieve this functionality. For example, the torque probe heat shield 24 may be a curved metal material positioned axially between the thermal blanket 33 and the torque probe 20. In another possible configuration, the torque probe heat shield 24 is a box or cuboid enclosing some or all of the torque probe 20. In yet another possible configuration, an example of which is shown in FIG. 2, the torque probe heat shield 24 is, or includes, a sleeve 26. The torque probe heat shield 24 may be used in the after-market, such as for retrofitting, replacing, or repairing a torque probe 20 and/or engine 10 to provide improved thermal protection for the torque probe 20.

Figure 3:
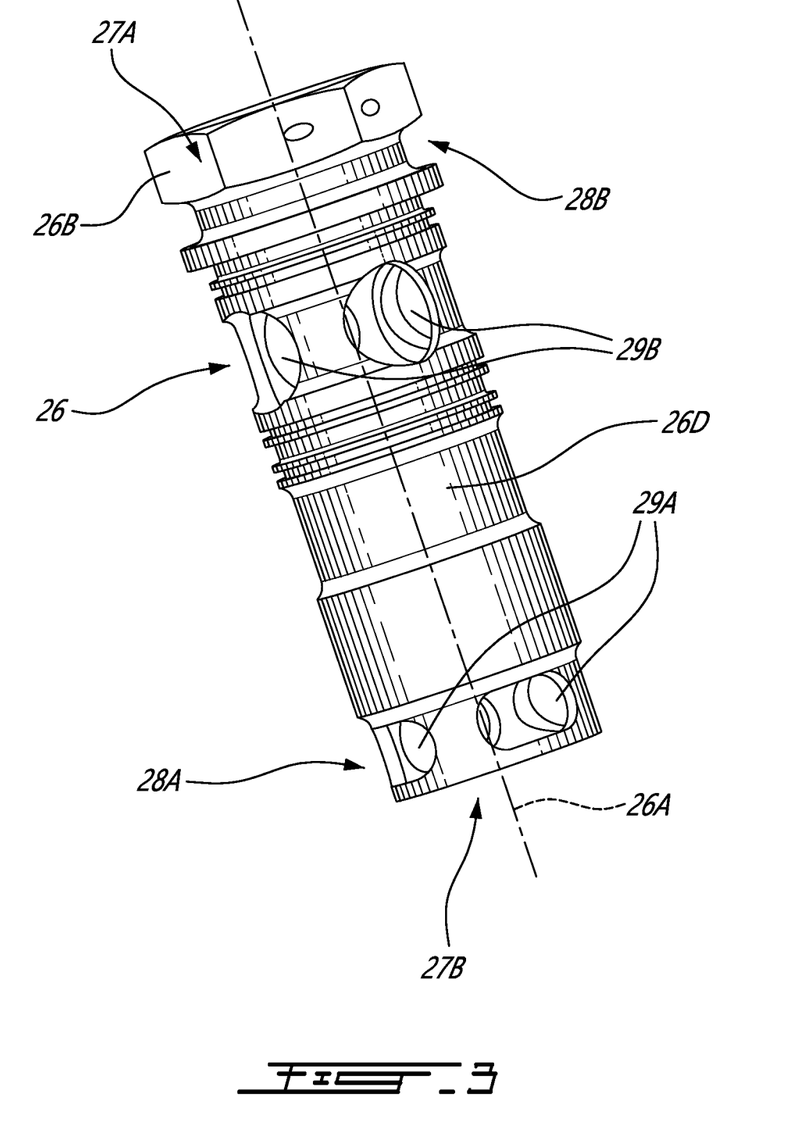
FIG. 3 is a perspective view of a sleeve mountable about the torque probe of FIG. 2.
Figure 4:
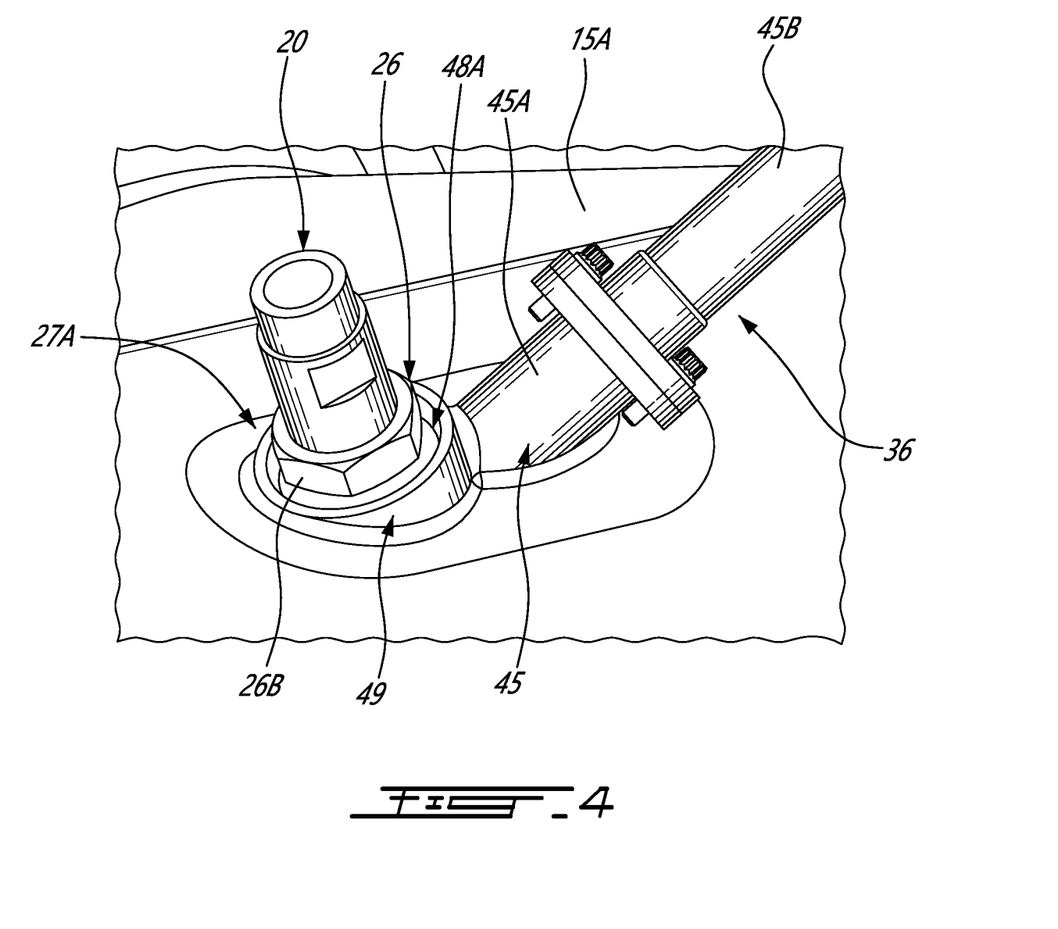
FIG. 4 is a perspective view of part of an outer surface of an exhaust case of the gas turbine engine of FIG. 1.

Referring to FIGS. 2 and 3, the sleeve 26 is a hollow body which encloses or houses the torque probe 20. The sleeve 26 is a separate and distinct component from the torque probe 20, and is mounted to the torque probe 20. In the embodiment shown in FIGS. 2 and 3, the sleeve 26 is a cylindrical body which fully surrounds some or all of an cylindrical outer surface 21A of the torque probe 20. The outer surface 21A of the torque probe 20 faces toward the interior of the exhaust case 15A. Referring to FIG. 2, the sleeve 26 fully surrounds only some of the length of the torque probe 20. The sleeve 26 may have other annular shapes which achieve the above-described functionality. The sleeve 26 extends along a sleeve axis 26A between a first sleeve end 27A and a second sleeve end 27B. Referring to FIG. 2, the first sleeve end 27A is disposed closer to the exhaust case 15A than the second sleeve end 27B. Referring to FIG. 2, the second sleeve end 27B is disposed closer to the bearing housing 40 than the first sleeve end 27A. Most of the axial length of the sleeve 26, defined along the sleeve axis 26A, is located within the exhaust case 15A and surrounds the outer surface 21A of the torque probe 20. Referring to FIGS. 2 and 4, some of the sleeve 26 at the first sleeve end 27A is positioned outside of the exhaust case 15A in the nacelle flow passage 19C. For example, an attachment nut 26B of the sleeve 26, used to secure the sleeve 26 to the torque probe 20, is positioned outside of the exhaust case 15A in the nacelle flow passage 19C. When the sleeve 26 is mounted to the torque probe 20, it is concentric with the torque probe 20. When the sleeve 26 is mounted to the torque probe 20, the sleeve axis 26A is coaxial with the torque probe axis 21.

For some engine configurations, the passive thermal protection provided by the thermal blanket 33 and/or the sleeve 26 may not be sufficient. The torque probe 20 may need to be further provided with more "active" thermal protection, which is now described in greater detail.

The active thermal protection of the torque probe 20 is provided by allowing a cooling fluid to flow along the outer surface 21A of the torque probe 20. This may be achieved in different ways. For example, and referring to FIG. 2, an inner surface 26BI of the sleeve 26 is spaced apart from the outer surface 21A of the torque probe 20 in a direction being radial to both the sleeve axis 26A and the torque probe axis 21. This spacing of the inner surface 26BI from the outer surface 21A forms an annular gap that surrounds the outer surface 21A. When a cooling fluid is allowed to circulate in this annular gap, the annular gap becomes a flow passage 28. The flow passage 28 is concentric about the torque probe axis 21. The flow passage 28 is concentric about the sleeve axis 26A. The flow passage 28 is elongated, and extends in a direction that is parallel to the torque probe axis 21.

Referring to FIGS. 2 and 3, the cooling fluid enters the flow passage 28 through a flow passage inlet 28A, and exits the flow passage 28 through a flow passage outlet 28B. The cooling fluid therefore travels through the entirety of the flow passage 28 along the outer surface 21A of the torque probe 20 to cool the torque probe 20. The flow passage inlet and outlet 28A,28B are defined in the sleeve 26. The flow passage inlet and outlet 28A,28B are axially spaced apart from each other along the sleeve axis 26A. The flow passage inlet and outlet 28A,28B are positioned entirely within the exhaust case 15A. The flow passage inlet 28A is in fluid communication with the bearing cavity 42 to receive the cooling fluid CF therefrom. The bearing cavity 42 is the source of the cooling fluid CF. The cooling fluid CF in FIG. 2 is therefore a mixture of air and oil entrained by the air from the bearing cavity 42. The oil may be in the form of an oil mist entrained by the air from the bearing cavity 42. The cooling fluid CF is said to be "cooling" because the air and oil mixture from the bearing cavity 42 is known to be at a lower temperature than the air within the exhaust case 15A surrounding the torque probe 20. Referring to FIG. 2, the bearing housing 40 has a protruding housing portion 46 that extends radially and defines a bearing housing passage 46A in fluid communication with both the flow passage inlet 28A and the bearing cavity 42. The bearing housing 40 also has an internal torque probe housing 48 within the exhaust case 15A that is spaced apart from, and separate from, the bearing housing passage 46A. The internal torque probe housing 48 is a cylindrical body that is coaxial along its length with the torque probe axis 21. It defines a through passage leading into the bearing cavity 42. The sleeve 26 is positioned in the internal torque probe housing 48 for displacement relative thereto, as explained in greater detail below. The torque probe 20 extends through the internal torque probe housing 48. Referring to FIG. 2, the sleeve 26 is sealed to the internal torque probe housing 48 on a side of the flow passage inlet 28A that is closest to the bearing housing 40, such as with an O-ring. This sealing helps to prevent oil mist and air from bearing cavity 42 entering the flow passage 28 or along the outer surface 21A of the torque probe 20.

Referring to FIGS. 2 and 3, the flow passage inlet 28A of the sleeve 26 is defined by one or more inlet slots 29A that extending through the sleeve 26 and form an opening therein. The inlet slots 29A extend from an inner surface of the sleeve 26 to an outer surface 26D of the sleeve 26. The inlet slots 29A are spaced apart from each other around a circumference of the sleeve 26. The inlet slots 29A are spaced apart circumferentially relative to the torque probe axis 21. The cooling fluid CF is directed along the torque probe axis 21 and along the sleeve axis 26A toward the first sleeve end 27A. Similarly, the flow passage outlet 28B is defined by one or more outlet slots 29B extending through the sleeve 26. The outlet slots 29B extend from the inner surface of the sleeve 26 to the outer surface 26D of the sleeve 26. The outlet slots 29B are spaced apart from each other around a circumference of the sleeve 26. The outlet slots 29B are spaced apart circumferentially relative to the torque probe axis 21. The outlet slots 29B are positioned closer to the exhaust case 15A than the inlet slots 29A. The outlet slots 29B are positioned radially outwardly from the inlet slots 29A relative to the center axis 11. The inlet and outlet slots 29A,29B may be of the same design, arrangement and size, or may differ from each other in any one of these respects. The number and size of the inlet and outlet slots 29A,29B may vary. It may be desirable to optimise the size of the inlet or outlet slots 29A,29B to make them as large as possible in view of the available space constraints. Referring to FIGS. 2 and 3, the inlet slots 29A are disposed at the second sleeve end 27B. The outlet slots 29B are positioned between the first and second sleeve ends 27A, 27B. The outlet slots 29B are closer to the exhaust case 15A than the inlet slots 29A. Thus, the flow passage outlet 28B of the sleeve 26 is positioned between opposite ends of the sleeve 26. In an alternate embodiment, the flow passage inlet 28A and/or the flow passage outlet 28B is defined by a singular annular opening in the sleeve 26.

Referring to FIGS. 2 and 4, a vent 36 is used to evacuate the cooling fluid CF from the exhaust case 15A after it has been used to cool the torque probe 20. The vent 36, sometimes referred to herein as a vent line 36, is any suitable tube, conduit, pipe, etc. that extends between a vent inlet 36A in fluid communication with the flow passage outlet 28B, and a vent outlet 36B that is located outside of the exhaust case 15A. Many different configurations of the vent 36 are possible to achieve this functionality. For example, and referring to FIGS. 2 and 4, a boss 45 on the outer surface of the exhaust case 15A defines part of the vent 36. The boss 45 includes a boss vent line 45A which extends through the exhaust case 15A. An inner end of the boss vent line 45A defines the vent inlet 36A and is in direct fluid communication with the flow passage outlet 28B. An outer end of the boss vent line 45A is positioned outside of the exhaust case 15A and is mounted to a main vent line 45B which extends along the outer surface of the casing 15 of the engine 10 to the AGB 50 (see FIG. 1). The main vent line 45B at the AGB 50 defines the vent outlet 36B.

During operation of the engine 10, the cooling fluid CF is caused to flow from the bearing cavity 42 to the main vent line 45B. Referring to FIG. 2, the cooling fluid CF flows from the bearing cavity 42, through the bearing housing passage 46A of the protruding housing portion 46 and into the inlet slots 29A of the flow passage inlet 28A. The cooling fluid CF is then conveyed through the flow passage 28 in a radially outward direction relative to the center axis 11 and in direct contact with the peripheral outer surface 21A of the torque probe 20 to cool the torque probe 20. It then flows through the outlet slots 29B of the flow passage outlet 28B, through the vent inlet 36A of the boss vent line 45B, out of the exhaust case 15A via the boss vent line 45A, and then along the main vent line 45B toward the vent outlet 36B.

The sleeve 26 and the flow passage 28 it defines thus use cooler fluid from the bearing cavity 42 to cool the torque probe 20. Although it provides an active cooling solution when compared to the static, passive cooling solutions provided by the thermal blanket 33 and torque probe heat shield 24, the cooling fluid CF is a passive fluid flow driven along the outer surface 21A of the torque probe 20. The cooling fluid CF is generated by the difference in pressure between the cooling fluid CF in the bearing cavity 42 and the pressure in the AGB 50 where the vent outlet 36B is positioned. Referring to FIGS. 1, 2 and 4, an interior of the reduction gearbox case 15B is in fluid communication with an interior of the accessory gearbox case 15E via the boss and main vent lines 45A,45B. An interior of the reduction gearbox case 15B is in fluid communication with the bearing cavity 42. This arrangement may take many forms.

For example, and referring to FIG. 2, the interior of the reduction gearbox case 15B and the bearing cavity 42 form a common open space within the casing 15 through which fluid is free to travel. Therefore, the boss and main vent lines 45A,45B fluidly link, via the sleeve 26, the RGB 31 and the AGB 50. The vent outlet 36B is in fluid communication with the AGB 50 or the accessory gearbox case 15E so that the cooling fluid CF may be discharged into the accessory gearbox case 15E. The vent 36 therefore helps to balance the pressure between the RGB 31 and the AGB 50. For example, air within the bearing cavity 42 may be pressurized to seal the bearings 44, and is evacuated along with oil mist out of the RGB 31 cavity to the AGB 50 because the cavity of the accessory gearbox case 15E is at a lower pressure than the reduction gearbox case 15B. The pressure differential between fluid in the reduction gearbox case 15B and the accessory gearbox case 15E causes the cooling fluid CF to flow from the bearing cavity 42 to the accessory gearbox case 15E, thereby allowing the cooling airflow CL to flow through the sleeve 26 along the outer surface 21A of the torque probe 20. The cooling fluid CF is thus driven passively by the pressure differential between the gearboxes 31,50, and the cooling fluid CF is dumped into the accessory gearbox case 15E. The cooling fluid CF is not actively driven by a pump or other device. In an alternate embodiment, however, a pump or other device may be used to supplement the cooling fluid CF, or to provide all of the cooling fluid CF. A fluid flow path is thus defined from the bearing cavity 42 to the vent outlet 36B positioned outside of the exhaust case 15A, such as in the accessory gearbox case 15E.

Thus, in the configuration shown in FIG. 2, the sleeve 26 and its flow passage 28 use the air and oil mist in the vent 36 between the RGB 31 and the AGB 50 to cool the torque probe 20. This technique allows for employing an existing vent line 36 between the RGB 31 and the AGB 50, which is already used to balance pressure between the gearboxes 31,50, and give it an additional cooling function. The use of an existing component of the engine 10, the vent line 36, helps to minimize the weight impact of this cooling technique. Thus, this cooling technique uses the passive fluid flow through an existing vent line 36 of the engine 10 and diverts it along the torque probe 20 to provide cooling. In an alternate embodiment, the vent line 36 vents to another location of the engine 10 outside of the exhaust case 15A that is at a lower pressure than the bearing cavity 42.

By flowing in the flow passage 28, the cooling fluid CF, which is cooler than the environment surrounding the exhaust duct 17, helps to maintain the torque probe 20 at an acceptable temperature. The sleeve 26 defining the flow passage 28 thus provides a cooling scheme surrounding the torque probe 20 that allows for the installation of the torque probe 20 in a hot environment. This may allow the temperature of the torque probe 20 to remain within an acceptable limit. The cooling fluid CF is thus an "active" cooling method, when compared to the passive thermal blanket 33 and the torque probe heat shield 24, which helps to provide increased cooling capacity. This may be helpful in conditions where the passive cooling systems are less efficient, such as during hot days or where there is low ventilation within the nacelle flow passage 19C. Using such an active cooling method may allow for the torque probe 20 to be used in harsher and hotter environments. By contributing to thermally protecting the torque probe 20 from the turbine exhaust environment, the active cooling fluid CF contributes to ensuring the reliability, accuracy and durability of the engine measurement system. Indeed, in a configuration of the engine 10, the active cooling provided by the cooling fluid CF is sufficient such that there is no need for the thermal blanket 33, the heat shield formed by the sleeve 26 and the cooling fluid CF being sufficient to provide adequate thermal protection for the torque probe 20.

Referring to FIGS. 2 and 4, the boss 45 on the outer surface of the exhaust case 15A also includes an external torque probe housing 49. The external torque probe housing 49 defines the protruding feature of the boss 45 which extends radially outwardly from the exhaust case 15A, and which delimits an opening 48A in the exhaust case 15A. The external torque probe housing 49 is used to locate the torque probe 20 and the sleeve 26. The external torque probe housing 49 extends inwardly from the exhaust case 15A a limited amount to locate the torque probe 20 and the sleeve 26 adjacent to the exhaust case 15A. The external torque probe housing 49 is an annular body which encloses the torque probe 20 and the sleeve 26 therein. The first sleeve end 27A is positioned radially outwardly of the external torque probe housing 49, as is part of the torque probe 20. The torque probe 20 and the sleeve 26 extend through the opening 48A.

Referring to FIG. 2, the sleeve 26 has suitable sealing to prevent the air and oil mixture of the cooling fluid CF from entering the hot zone surrounding the exhaust duct 17, and to prevent the cooling fluid CF from entering the nacelle flow passage 19C. The sleeve 26 is sealed to the exhaust case 15A, such that the cooling fluid CF is prevented from entering, or escaping from, the exhaust case 15A. Referring to FIG. 2, the sleeve 26 has sealing on opposite sides of the flow passage outlet 28B. The sleeve 26 is sealed on a first side of the flow passage outlet 28B that is closer to exhaust case 15A, and is also sealed to the exhaust case 15A on a second side of the flow passage outlet 28B that is closer to the bearing housing 40 than the first side of the flow passage outlet 28B. The sealing with the exhaust case 15A defines a plenum 43 about or around the flow passage outlet 28B. Referring to FIG. 2, the plenum 43 is an annular volume that circumferentially surrounds the cylindrical outer surface 26D of the sleeve 26. The plenum 43 is in fluid communication with the vent inlet 36A, such that the cooling fluid CF flows through the outlet slots 29B, into the plenum 43 and through the vent inlet 36A. The sealing of the exhausts case 15A thus confines the cooling fluid CF to flow through the flow passage 28 and along the torque probe 20, thereby preventing the cooling fluid CF from exiting exhaust case 15A except via the path to the vent outlet 36B.

Referring to FIG. 2, one possible configuration of sealing for the sleeve 26 is described in greater detail. The external torque probe housing 49 extends inwardly from the exhaust case 15A and delimits the opening 48A in the exhaust case 15A. A first seal 41A is positioned between an inner surface of the external torque probe housing 49 and the outer surface 26D of the sleeve 26 on the first side of the flow passage outlet 28B closest to the exhaust case 15A. The first seal 41A helps to seal off the plenum 43 so that the cooling fluid CF therein does not escape through the opening 48A into the nacelle flow passage 19C. A second seal 41B is positioned between the inner surface of the torque probe housing 49 and the outer surface 26D of the sleeve 26 on the second side of the flow passage outlet 28B closest to the bearing housing 40. The second seal 41B helps to seal off the plenum 43 so that the cooling fluid CF therein does not escape into the hot zone of the exhaust case 15A surrounding the exhaust duct 17. The first and second seals 41A,41B delimit the plenum 43 along with the surfaces of the sleeve 26 and the external torque probe housing 49. The axial extent of the plenum 43, as measured in a direction parallel to the sleeve axis 26A, is defined between the axially spaced-apart first and second seals 41A,41B. In the configuration shown, once the cooling fluid CF exits the sleeve 26, it enters the plenum 43 created by the first and second seals 41A,41B, to then flow passively into the vent inlet 36A. The first and second seals 41A,41B are dynamic seals. As opposed to static seals, the first and second seals 41A,41B accommodate the movement of the torque probe 20 and of the sleeve 26 relative to the exhaust case 15A during operation of the engine 10, while still performing their sealing function. The torque probe 20 and sleeve 26 are mounted relative to exhaust case 15A and the bearing housing 40 such that they are able to displace relative to these bodies in a direction along the torque probe axis 21 due to thermal loads, or due to maneuver loads during aircraft fight. The first and second seals 41A,41B may be mounted against any suitable land or flange of the sleeve 26 and/or of the external torque probe housing 49, as shown in FIG. 2. Alternatively, one or both of the first or second seals 41A,41B may be static seals. In an alternate embodiment, the sleeve 26 is free of sealing with the exhaust case 15A. In such an embodiment, the flow passage outlet 28B is directly coupled to the vent inlet 36A.

Referring to FIG. 2, and as mentioned above, the sleeve 26 and flow passage 28 cooling technique disclosed herein may be applied against only some of the length of the torque probe 20, as measured along the torque probe axis 21. The torque probe includes a first torque probe segment 23A having a first length defined along the torque probe axis 21, and a second torque probe segment 23B extending from the first torque probe segment 23A and having a second length defined along the torque probe axis 21. The first torque probe segment 23A is disposed within the exhaust case 15A and is exposed to the exhaust duct 17, such that first torque probe segment 23A is exposed to heat radiating from the hot exterior surface 17C of the exhaust duct 17 during operation of the engine 10. The second torque probe segment 23B is longer than the first torque probe segment 23A. The second torque probe segment 23B extends radially inwardly relative to the center axis 11 from the first torque probe segment 23A through the bearing cavity 42 to an end in proximity to the output shaft 18A. The flow passage 28 defined by the sleeve 26 extends along only the first length of the first torque probe segment 23A, since this is the portion of the torque probe 20 that may require thermal protection. Referring to FIG. 2, some or all of the first torque probe segment 23A lies, or is positioned, outside of the thermal blanket 33. The second torque probe segment 23B is covered by the thermal blanket 33.

Figure 5:
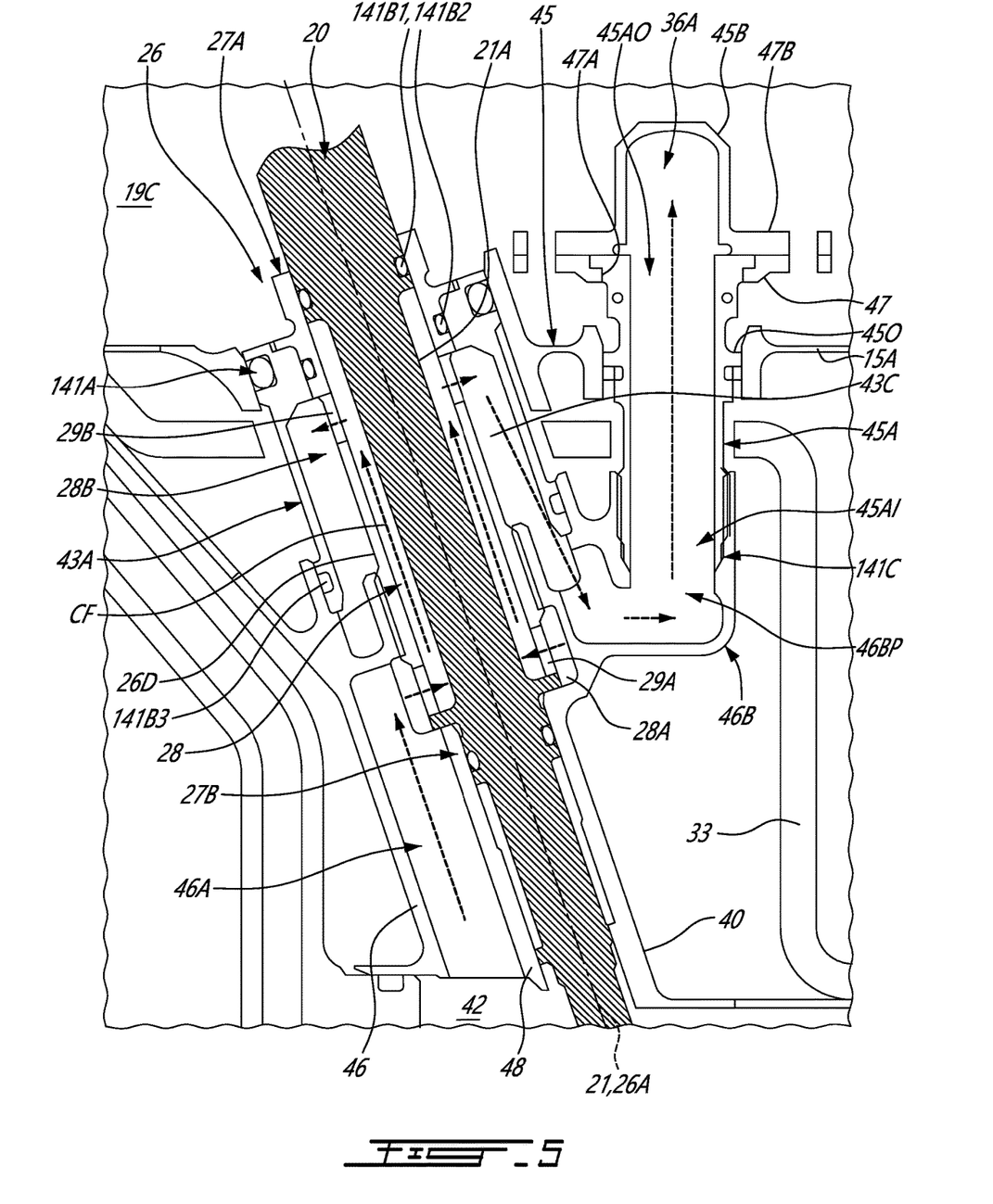
FIG. 5 is an enlarged cross-sectional view of part of the gas turbine engine of FIG. 1 showing another configuration of the torque probe.

Referring to FIG. 5, another configuration for cooling the torque probe 20 is now described in greater detail. Any feature shown in FIG. 5 which is not annotated with a reference number has the same reference number as the similar feature shown in FIGS. 1-4. Similarly, the description of a feature above with respect to FIGS. 1-4 applies mutatis mutandis to the similar feature shown in FIG. 5. A vent conduit 45A is disposed partially within the exhaust case 15A, and also extends through the exhaust case 15A. The vent conduit 45A extends through another opening 450 in the exhaust case 15A delimited by the boss 45 on the outer surface of the exhaust case 15A. The vent conduit 45A is a separate component from the main vent line 45B and from the sleeve 26. The vent conduit 45A is disposed between the sleeve 26 and the vent 36.

An inner end of the vent conduit 45A defines a vent conduit inlet 45AI and is in fluid communication with the flow passage outlet 28B within the exhaust case 15A. An outer end of the vent conduit 45A is positioned outside of the exhaust case 15A and defines a vent conduit outlet 45AO. The vent conduit outlet 45AO is in fluid communication with the vent inlet 36A. The outer end is mounted to the main vent line 45B which extends along the outer surface of the casing 15 of the engine 10 to another portion of the casing 15, such as the accessory gearbox case 15E. The inner end of the vent conduit 45A is threaded and is fixedly mounted to a venting line mounting 46B that is part of the bearing housing 40. The venting line mounting 46B defines a venting line mounting passage 46BP through which the cooling fluid CF enters after exiting the flow passage outlet 28B. The vent conduit 45A does not displace relative to the exhaust case 15A. The configuration represented in FIG. 5 shows that the cooling fluid CF flows indirectly between the flow passage 28 and the vent 36, via a separate threaded venting line mounting 46B. Although shown in FIG. 5 as being covered by the thermal blanket 33, the venting line mounting 46B may be uncovered and unshielded relative to the exhaust duct 17 because it is merely a transfer tube that is free of heat sensitive electronic components.

Referring to FIG. 5, a plenum body 43A, shown in FIG. 5 as another sleeve, is sealed to the exhaust case 15A on a first side of the flow passage outlet 28B nearest to the exhaust case 15A, and is sealed to the bearing housing 40 on a second side of the flow passage outlet 28B nearest to the bearing housing 40. The plenum body 43A is also spaced apart from the outer surface 26D of the sleeve 28, so as to form a second plenum 43C about the flow passage outlet 28B between the plenum body 43A and the sleeve 26. The second plenum 43C is an annular volume that circumferentially surrounds the cylindrical outer surface 26D of the sleeve 26. The second plenum 43 is in fluid communication with the vent conduit inlet 45AI via the venting line mounting 46B, such that the cooling fluid CF flows through the outlet slots 29B, into the second plenum 43C and through the venting line mounting 46B. The axial extent of the second plenum 43C, as measured in a direction parallel to the sleeve axis 26A, is defined between the axially spaced-apart seals shown in FIG. 5.

One possible sealing configuration is shown in FIG. 5. A rope seal 141A is defined between an outer surface of the plenum body 43A and the boss or other surface of the exhaust case 15A, to prevent air from the nacelle flow passage 19C flowing into the exhaust case 15A. A first static O-ring 141B1 is provided between the outer surface 21A of the torque probe 20 and an inner surface of the sleeve 26, a second static O-ring 141B2 is provided between the outer surface 26D of the sleeve 26 and the inner surface of the plenum body 43A, and a third static O-ring 141B3 is provided between an outer surface of the plenum body 43A and an inner surface of the bearing housing portion 46. The first, second and third static O-rings 141B1,141B2,141B3 prevent relative movement between their sealed components, such that the torque probe 20, the sleeve 26, the bearing housing portion 46 and the plenum body 43A are configured to displace together relative to the exhaust case 15A in response to thermal or maneuvering loads, as explained above. The first and second static O-rings 141B1 and 141B2 prevent the oil and air mixture of cooling fluid CF from escaping the second plenum 43C and entering the nacelle flow passage 19C. The third static O-ring 141B3 prevents the oil and air mixture of cooling fluid CF from escaping the second plenum 43C and entering the inner cavity of the exhaust case 15A. A static metallic crush seal 141C is provided between the inner end of the vent conduit 45A and the outlet of the venting line mounting 46B. When the vent conduit 45A is threadably attached to the venting line mounting 46B, the static metallic crush seal 141C is compressed to create a seal.

The vent conduit 45A and the main vent line 45B may be attached together using any suitable technique. For example, and referring to FIG. 5, the outer end of the vent conduit 45A includes a floating flange 47 that is mounted to the main vent line 45B. In the illustrated embodiment, the orientation of the vent conduit 45A may be difficult to predict once it has been threadably attached to the venting line mounting 46B, whereas the orientation of the main vent line 45B and its direction along the outer surface of the exhaust case 15A is known. The floating flange 47 allows the vent conduit 45A to be connected to the main vent line 45B irrespective of the orientation of the outer end of the vent conduit 45A. The floating flange 47 may have any suitable configuration to achieve this functionality. For example, the floating flange 47 may be shaped like a parallelogram and have a central aperture 47A. The floating flange 47 is placed onto the outer end of the vent conduit 45A after the vent conduit 45A has been mounted to the bearing housing 40, by inserting the outer end of the vent conduit 45A into the central aperture 47A of the floating flange 47. The orientation of the floating flange 47 can be selected based on the known orientation of the mating flange 47B of the main vent line 45B. Once the floating flange 47 and the mating flange 47B are brought together, they may be secured to one another with suitable fasteners, so as to fluidly connect the internal and external venting lines 45A,45B such that the main vent line 45B has the desired orientation toward the AGB 50.

During operation of the engine 10 in the configuration shown in FIG. 5, the cooling fluid CF is conveyed passively from the bearing cavity 42, through the bearing housing passage 46A and into the flow passage 28 via the inlet slots 29A. The cooling fluid CF travels in a radially outward direction relative to the center axis 11 and in direct contact with the peripheral outer surface 21A of the torque probe 20 to cool the torque probe 20. It then flows through the outlet slots 29B of the flow passage outlet 28B, into the second plenum 43C, and through the venting line mounting passage 46BP before entering the vent conduit 45A. It then flows along the vent conduit 45A out of the exhaust case 15A, and then along the main vent line 45B toward the vent outlet 36B at the AGB 50.

Referring to FIG. 2, a method for cooling the torque probe 20 includes forming the fluid flow path from the bearing cavity 42 to the vent outlet 36B positioned outside of the exhaust case 15A, such as at the accessory gearbox case 15E. The method includes positioning the torque probe 20 within the fluid flow path downstream of the bearing cavity 42 and upstream of the vent outlet 36B. The cooling fluid CF flows from the bearing cavity 42, along the torque probe 20 to cool the torque probe 20, and to the vent outlet 36B when the engine 10 is operating. Referring to FIG. 2, a method of cooling the torque probe 42 includes allowing an oil and air mixture from the bearing housing 40 to be driven along the outer surface 21A of the torque probe 20, either passively or actively. The method also includes discharging the oil and air mixture out of the exhaust case 15A enclosing part of the torque probe 20.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, and such modifications would be within the scope of the present technology.

The invention claimed is:

1. A gas turbine engine, comprising:
   an exhaust case enclosing an exhaust duct and a bearing housing, the bearing housing defining a bearing cavity and enclosing bearings mounted to a shaft;
   a torque probe extending inwardly into the exhaust case along a torque probe axis and positioned adjacent to the exhaust duct, the torque probe configured to determine a torque on the shaft;
   a sleeve enclosing at least part of the torque probe, the sleeve defining a flow passage between an inner surface of the sleeve and an outer surface of the torque probe, the flow passage being in fluid communication with a flow passage inlet of the sleeve and with a flow passage outlet of the sleeve, the flow passage inlet in fluid communication with the bearing cavity to receive a cooling fluid therefrom; and
   a vent extending between a vent inlet in fluid communication with the flow passage outlet and a vent outlet positioned outside the exhaust case;
   wherein during operation of the gas turbine engine, the cooling fluid flows from the bearing cavity, into the flow passage along the outer surface of the torque probe to cool the torque probe, and into the vent to be discharged via the vent outlet.

2. The gas turbine engine of claim 1, comprising a gearbox case housing a reduction gearbox, an interior of the gearbox case being in fluid communication with the bearing cavity, the gas turbine engine comprising an accessory gearbox positioned outside the exhaust case, the vent extending to the accessory gearbox and the vent outlet in fluid communication with the accessory gearbox.

3. The gas turbine engine of claim 1, wherein the sleeve is sealed to the exhaust case on a first side of the flow passage outlet and sealed to the exhaust case on a second side of the flow passage outlet, the first side disposed closer to the exhaust case than the second side, the sleeve sealed to the exhaust case defining a plenum about the flow passage outlet, the plenum in fluid communication with the vent inlet.

4. The gas turbine engine of claim 1, wherein the exhaust case includes a torque probe housing extending inwardly from the exhaust case and delimiting an opening in the exhaust case, the torque probe and the sleeve disposed within the torque probe housing, a first seal disposed between the torque probe housing and an outer surface of the sleeve on a first side of the flow passage outlet, a second seal disposed between the torque probe housing and the outer surface of the sleeve on a second side of the flow passage outlet, the first and second seals defining a plenum between the torque probe housing and the outer surface of the sleeve, the plenum in fluid communication with the vent inlet.

5. The gas turbine engine of claim 1, wherein the flow passage inlet of the sleeve is defined by one or more inlet slots extending through the sleeve.

6. The gas turbine engine of claim 1, wherein the torque probe includes a first torque probe segment having a first length defined along the torque probe axis, and a second torque probe segment extending from the first torque probe segment and having a second length defined along the torque probe axis, the first torque probe segment disposed within the exhaust case and exposed to the exhaust duct, the flow passage extending along only the first length of the first torque probe segment.

7. The gas turbine engine of claim 1, comprising a thermal blanket disposed within the exhaust case and between the torque probe and the exhaust duct, the thermal blanket having an opening and the torque probe extending through the opening.

8. The gas turbine engine of claim 6, comprising a thermal blanket disposed within the exhaust case and between the torque probe and the exhaust duct, the thermal blanket having an opening and the torque probe extending through the opening, at least part of the first torque probe segment positioned outside the thermal blanket.

9. The gas turbine engine of claim 1, wherein the flow passage is coaxial with the torque probe.

10. The gas turbine engine of claim 5, wherein the flow passage outlet of the sleeve is defined by one or more outlet slots extending through the sleeve, the one or more outlet slots positioned closer to the exhaust case than the one or more inlet slots.

11. The gas turbine engine of claim 5, wherein the sleeve extends between a first sleeve end and a second sleeve end disposed closer to the exhaust case than the first sleeve end, the one or more inlet slots disposed at the first sleeve end, the flow passage outlet of the sleeve being defined by one or more outlet slots extending through the sleeve, the one or more outlet slots positioned between the first and second sleeve ends.

12. The gas turbine engine of claim 1, comprising a vent conduit disposed between the sleeve and the vent, the vent conduit extending between a vent conduit inlet in fluid communication with the flow passage outlet and a vent conduit outlet in fluid communication with the vent inlet.

13. The gas turbine engine of claim 1, comprising a plenum body sealed to the exhaust case on a first side of the flow passage outlet and sealed to the bearing housing on a second side of the flow passage outlet, the plenum body spaced apart from an outer surface of the sleeve and defining a second plenum about the flow passage outlet, the second plenum in fluid communication with the vent inlet.

14. A method for cooling a torque probe disposed adjacent to an exhaust duct within an exhaust case of a gas turbine engine, the method comprising:
  forming a fluid flow path from a bearing cavity of the gas turbine engine to an outlet positioned outside of the exhaust case; and
  positioning the torque probe within the fluid flow path downstream of the bearing cavity and upstream of the outlet, a cooling fluid flowing from the bearing cavity, along the torque probe to cool the torque probe, and to the outlet when the gas turbine engine is operating.

15. The method of claim 14, wherein forming the fluid flow path includes sealing the fluid flow path at the exhaust case to confine the cooling fluid to flow along the torque probe.

16. The method of claim 14, wherein positioning the torque probe within the fluid flow path includes positioning only a part of a length of the torque probe within the fluid flow path downstream of the bearing cavity and upstream of the outlet, the cooling fluid flowing along only the part of the length of the torque probe to cool the torque probe when the gas turbine engine is operating.

17. The method of claim 14, wherein forming the fluid flow path includes forming the fluid flow path between a reduction gearbox of the gas turbine engine and an accessory gearbox of the gas turbine engine positioned outside the exhaust case, the outlet in fluid communication with the accessory gearbox.

18. A torque probe heat shield mountable about an outer surface of a torque probe, the torque probe heat shield comprising: an elongated sleeve extending along a sleeve axis between a first sleeve end and a second sleeve end, the sleeve mountable about the torque probe to define a flow passage between an inner surface of the sleeve and an outer surface of the torque probe, the flow passage being in fluid communication with a flow passage inlet of the sleeve and with a flow passage outlet of the sleeve spaced apart along the sleeve axis from the flow passage inlet, a cooling fluid configured to flow into the flow passage via the flow passage inlet, through the flow passage along the outer surface of the torque probe to cool the torque probe, and out of the flow passage via the flow passage outlet.

19. The torque probe heat shield of claim 18, wherein the flow passage inlet is defined by one or more inlet slots extending through the sleeve.

20. The torque probe heat shield of claim 19, wherein the one or more inlet slots are disposed at the first sleeve end, the flow passage outlet of the sleeve being defined by one or more outlet slots extending through the sleeve, the one or more outlet slots positioned between the first and second sleeve ends.

\* \* \* \* \*